United States Patent [19]

Martensson et al.

[11] Patent Number: 5,162,066
[45] Date of Patent: Nov. 10, 1992

[54] METHOD FOR THE MANUFACTURE OF A LAMINATED MATERIAL STRIP

[75] Inventors: Kjell Martensson, Malmö; Lars Carlsson, Blentarp, both of Sweden

[73] Assignee: AB Profor, Lund, Sweden

[21] Appl. No.: 401,127

[22] Filed: Sep. 1, 1989

[30] Foreign Application Priority Data

Sep. 13, 1988 [SE] Sweden ................ 8803211

[51] Int. Cl.$^5$ ............................. B32B 31/18
[52] U.S. Cl. .................. 156/163; 156/164; 156/204; 156/207; 156/268; 156/270
[58] Field of Search ........... 156/160, 163, 164, 207, 156/210, 268, 270, 300, 301, 302, 303, 303.1, 470, 471, 472, 473, 519, 522, 552, 204; 53/450, 453, 456

[56] References Cited

U.S. PATENT DOCUMENTS

| | | |
|---|---|---|
| 1,119,512 | 12/1914 | Hupfel . |
| 3,531,350 | 9/1970 | Rausing et al. . |
| 3,628,408 | 12/1971 | Rod . |
| 3,698,977 | 12/1969 | Susuki et al. . |
| 3,716,436 | 2/1973 | Pall et al. . |
| 3,788,028 | 1/1974 | Folkesson et al. . |
| 3,796,621 | 3/1974 | Butcher ............... 156/207 |
| 3,813,315 | 5/1974 | Valyi . |
| 3,929,045 | 12/1975 | Palsson . |
| 4,081,944 | 4/1978 | Sjostrand . |
| 4,351,461 | 9/1982 | Carlsson . |
| 4,384,438 | 5/1983 | Hilmersson . |
| 4,401,250 | 8/1983 | Carlsson . |
| 4,417,938 | 11/1983 | Sigl ...................... 156/270 |
| 4,425,173 | 1/1984 | Krick .................... 156/270 |
| 4,498,944 | 2/1985 | Krause et al. ......... 156/164 |

FOREIGN PATENT DOCUMENTS 1362060  7/1974  United Kingdom .

Primary Examiner—Caleb Weston
Attorney, Agent, or Firm—Burns, Doane, Swecker & Mathis

[57] ABSTRACT

A method for manufacturing a laminated strip having a gas barrier material laminated in a liquid-tight manner between two external films includes the steps of forming surface irregularities in a first film, laminating a web gas barrier material to the first film, transversely cutting the gas barrier material and applying a second film over the gas barrier material. The apparatus for manufacturing the laminated strip includes a pair of cooperating rolls between which the first film is fed for forming irregularities in the first film. Two other cooperating rolls are provided for cutting the gas barrier member after it has been laminated to the first film. Two additional cooperating rolls are also provided for laminating the second film to the gas barrier material and the first film.

6 Claims, 1 Drawing Sheet

METHOD FOR THE MANUFACTURE OF A LAMINATED MATERIAL STRIP

FIELD OF THE INVENTION

The present invention relates to a method and apparatus for manufacturing a laminated material and more particularly, a method and apparatus for manufacturing a laminated material strip comprising an inner foil wholly enclosed between two external films.

BACKGROUND OF THE INVENTION

When packing containers of a non-returnable type are manufactured through folding and heat-sealing of flexible packing laminate which comprises a carrier layer of paper, absorption of the contents at the edges is prevented by sealing off the cut edges which will be located inside the packing containers with the help of material strips of thermoplastic material which are heat-sealed to the inside of the packing material. In packing containers of the aseptic type or when for other reasons imperviousness of the container to gas and light is necessary, the strip cannot simply be manufactured from thermoplastic material but should also include a suitable barrier layer, e.g., an aluminum foil layer. Since contact with certain acid contents, e.g., fruit juices or wine, may involve precipitation of aluminum into the contents, the foil has to be wholly covered by layers of a thermoplastic material strip. Strips of this kind are know and comprise a relatively narrow layer of aluminum foil which on both sides is surrounded by layers of thermoplastic material whose edges extend beyond the edges of the aluminum foil and which are sealed in a liquid-tight manner to one another. Upon cutting of a material strip of this type, however, the aluminum foil is exposed once again o the cut surfaces and it has not been possible up to now to manufacture in a rational manner a strip of the required length in which an internal layer of barrier material, e.g., aluminum foil, is wholly enclosed by surrounding layers on all four edges of the strip.

OBJECTS AND SUMMARY OF THE INVENTION

It is an object of the present invention, therefore, to provide a method of manufacturing such a strip, and for this method to be highly suitable for rapid manufacture by machine.

It is a further object of the present invention to provide a method of manufacturing a laminated material strip comprising an inner foil wholly enclosed between two external films, this method being simple and reliable and not subject to the disadvantages of previously known methods.

These and other objects have been achieved in accordance with a method according to the present invention in which a web-like first film is provided at equal intervals with transverse irregularities in the form of folds or elevations projecting from one side of the film. A web-like inner foil is laminated to the first film and is cut off opposite the irregularities to form transverse strips of foil. The irregularities are then flattened out by stretching the film web. A second film is applied against the free surface of the inner foil and against parts of the first film which are situated between the strips of inner foil. The two films are then cut in the transverse direction.

It is a further object of the present invention to provide an apparatus for carrying out that foregoing method, this apparatus being of a simple and reliable design which permits a high rate of production.

It is a further object of the present invention to provide an apparatus for carrying out the foregoing method, in which all of the material layers included ar introduced in the form of webs.

These and other objects have been achieved in accordance with the apparatus of the present invention which comprises a work roll with transverse recesses arranged on its peripheral surface and a mating roll provided with corresponding projections, means for controlling a first film web between the rolls and for joining the film web to a foil web, cutting means for dividing the foil web into individual strips, rolls for flattening out of the irregularities and means for laminating a second film web thereto.

Through the method and the apparatus in accordance with the present invention, it is possible to manufacture rapidly and reliably laminated strips comprising a wholly enclosed inner foil, these strips being highly suitable for use in packing machines of a known type. The strips can be manufactured from weblike material which simplifies the feed of the arrangement in accordance with the invention. After the manufacture of the laminated material strip it may be supplied to the packing machine either in the form of individual pieces of strip or in the form of a continuous web which is divided into individual pieces of strip only in connection with its application to the packing material.

BRIEF DESCRIPTION OF THE DRAWINGS

A preferred embodiment of the method as well as of the arrangement in accordance with the invention will now be described in more detail with special reference to the attached, schematic drawing which shows the details necessary for an understanding of the invention, wherein.

DETAILED DESCRIPTION OF THE PREFERRED EMBODIMENTS

Figure 1:
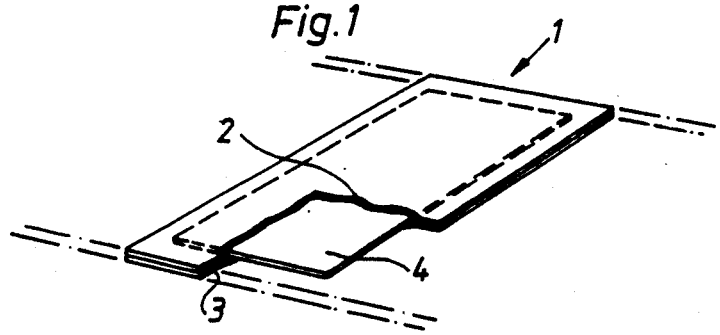
FIG. 1 is a perspective view of a material strip manufactured according to the method and the apparatus of the invention.

A material strip of the type which is intended to be manufactured with the help of the method and the apparatus in accordance with the present invention is illustrated in FIG. 1. The strip comprises at least three layers laminated to one another, namely two external films 2,3 of thermoplastic material, e.g., polythene, and an inner foil 4 of a so-called barrier material which is impervious to gas and/or light, e.g., aluminum foil. The inner foil is of a somewhat smaller length and width than the two outer films, 2,3 which are sealed to one another around all four edges of the inner foil 4 so that the foil is enclosed in a water-tight manner between the two films 2,3. The first and the second films 2,3 preferably are also laminated to the respective surfaces of the foil 4 which may be covered with any suitable bonding agent, not shown here, e.g., thermoplastic material of the same type as the material from which the films 2,3 are made. The dash-dotted lines in FIG. 1 indicate the longitudinal edges of the two materials or film webs which constitute the two outer films 2,3 and it is thus evident that the material strip extends transversely across the webs. Naturally, the material strip may also extend lengthwise on the material webs. This depends only on the mutual proportions of the material strip and the webs. The material strip 1 may be separated from the webs after manufacture, but it is also possible to allow the material strip wholly or partly to retain its contact with adjoining material strips, so that a coherent web is maintained which is used for feeding the material strips in a simple manner into the machine where they are subsequently going to be used, e.g., for sealing off a pouring opening or a sealing joint in a packing container. Strips of a similar type are used, for example, for the sealing of a longitudinal joint in a packing container of a known type which is manufactured by conversion of weblike packing material to a tube, which thereafter is filled with contents and is sealed off transversely at equal intervals. The material strip is then heat-sealed along one longitudinal cut edge of the packing material web so that the latter is sealed off towards the interior of the packing container after the conversion of the packing material web to a tubular shape. The length of the material strip here will coincide with the length of the packing container, so that the cut ends of the material strip, where the central layer of the material strip actually is exposed, do not come into contact with the packed contents and thus do not cause a problem. However, if a material strip of this type is intended to be used for sealing off, for example, the cut edge around a pouring opening, the end edges of the material strip do come into contact with the contents, and for this reason up to now the range of application has been limited to contents of the type which do not react with, or are not adversely affected by the layer of aluminum foil of the material strip. The total enclosure of the barrier layer of the material strip which is achieved in accordance with the method and apparatus according to the present invention eliminates this problem.

Figure 2:
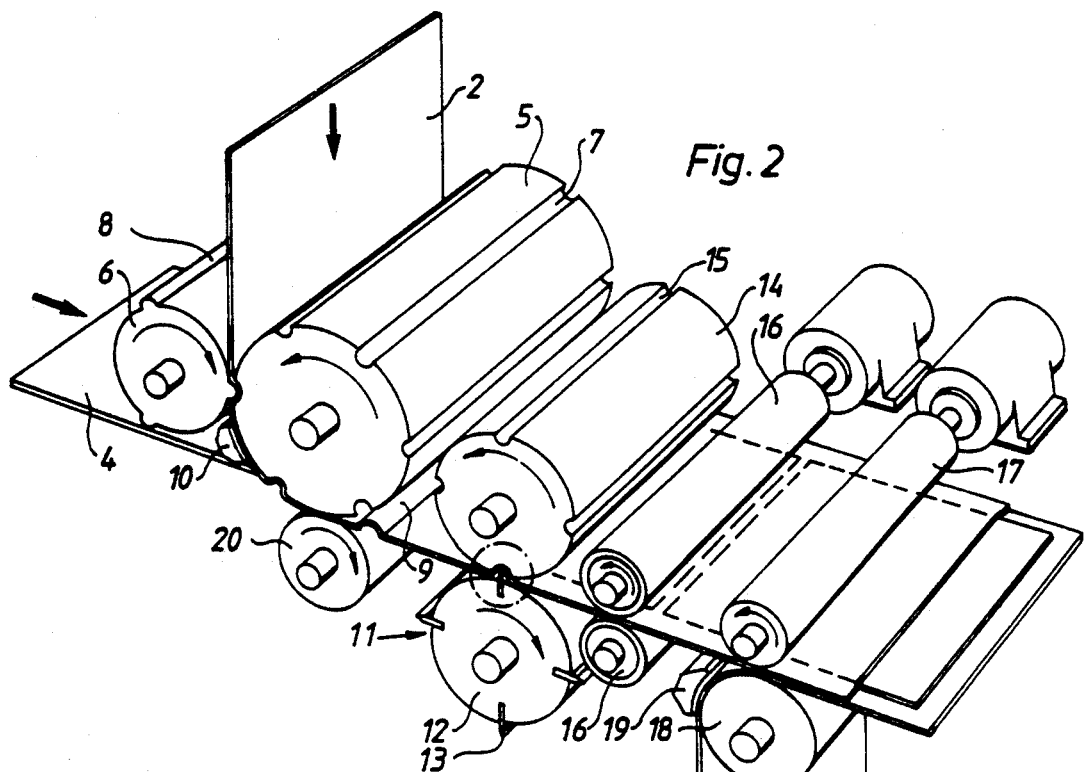
FIGS. 2 and 3 are perspective views of the apparatus in accordance with the present invention.
Figure 3:
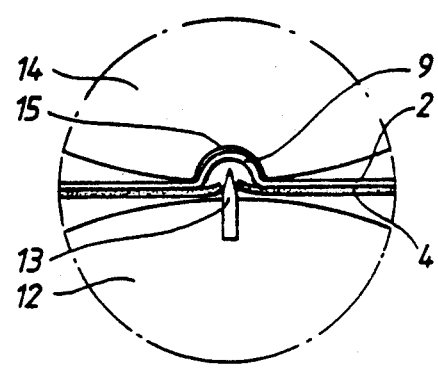

An apparatus for carrying out the method in accordance with the present invention is illustrated in FIG. 2., from which it is evident how three material webs with the help of the arrangement by means of processing and laminating are converted to a material strip of the type described above. As mentioned earlier, the material strip 1 in accordance with the present invention is manufactured in its simplest form from three different material layers which are supplied in the form of webs to the apparatus in accordance with the present invention. The first film 2 consisting of thermoplastic material, such as polythene, is fed substantially vertically downwards to the nip between a work roll 5 and a mating roll 6 which rotate in opposite directions as indicated by arrows and thereby contribute to the advance of the film 2 through the nip of the rolls. The main shape of the work roll 5 is cylindrical and its circumferential surface possesses a number of U-shaped grooves or recesses 7 which extend transversely over the whole work surface of the rolls. A number of recesses 7 are distributed at intervals around the circumference of the roll and the bottom of the recesses 7 may be provided with a number of holes which via vacuum ducts (now shown) situated inside the work roll 5 communicate with an external vacuum source of a conventional type.

The mating roll 6 too is of a shape which is mainly cylindrical but is provided with projections 8 corresponding to the recesses 7, which extend transversely over the work surface of the mating roll 6 and are at a mutual distance which corresponds to the distance between two consecutive recesses 7 on the work roll 5. Upon rotation of the rolls, 5,6, the projection 8 will press a part of the film 2 into the recesses 7 in the work roll 5 to produce a transverse irregularity 9 across the film web. The irregularities 9 are in the shape of folds or elevations which are impressed into the film 2, and depending on the film material, these folds or elevations 9 will be more or less permanent. To prevent the irregularities 9 from being smoothed out through tension in the film web after the projection 8 has left the corresponding recess 7, the recess 7, as mentioned earlier, may be connected to a vacuum source which ensures that the irregularities retain their shape even when the film web during the continuing rotation of the work roll 5 passes and is heated by a heat source of the radiant type which is placed along the periphery of the work roll 5 and which serves for heating the thermoplastic film 2 to a softening or laminating temperature.

After the first film 2 has been provided with transverse irregularities 9 and has been heated to a lamination temperature, the film 2 is combined with the foil 4 which, also in web form, is introduced into the arrangement in accordance with the invention s that it can be fed between the work roll 5 mentioned earlier and a further mating roll or laminating roll 20. The foil 4 preferably consists of a layer of aluminum foil which in advance has been provided on both sides with a suitable heat-meltable bonding agent, for example, polythene, of the same type as the material of the film 2. The foil web 4 possibly may also be heated prior to the lamination. When a suitable lamination temperature has been attained, the foil 4 is combined with the film 2 in the nip between the work roll 5 and the laminating roll 20 s that they are durably joined to one another. The foil web 4 here is of a slightly smaller width than the film web 2 which means that the film 2 will extend somewhat beyond the edges of the foil 3, as will be explained in more detail later. Since the transverse irregularities 9 of the film 2 remain in the recesses 7 in the work roll 5 even during the course of the lamination, the film 2 after lamination to the foil 4 will still have the irregularities at which the foil is not laminated to the film 2 owing to the absence of lamination pressure. Instead, at points opposite the irregularities 9 the foil instead extends in a substantially planar manner between edges of the irregularities so that a space appears between the folded or elevated film 2 and the planar foil 4, and this space is used for making possible repeated transverse cutting of the foil web with the help of the succeeding cutting means 11.

The cutting means 11 comprises a cutting roll 12 which is provided with edges 13 which are located on the side of the laminated material where the foil 4 is situated. The cutting roll 12 cooperates with a mating roll 14 which is situated at the opposite side of the laminated web. The mating roll 14 is provided with grooves 15 for accommodating the transverse irregularities 9, these grooves 15 being adapted to cooperate with the cutting edges 13 of the cutting roll 12. The two rolls 12 and 13, like the rolls 5,6 referred to earlier, are coupled together in pairs for synchronous movement in opposite directions.

When the web consisting of the film 2 and the foil 4 passes the cutting means 11 in the nip between the cutting roll 12 and the mating roll 14 the cutting edges 13 will cut the foil 4 transversely at positions opposite the place of each irregularity. In this way the foil can be cut off completely without the cutting edge reaching as far as, or damaging the film 2, and the individual foil strips remain joined to the film 2 to which they are laminated over substantially their entire surface, apart from very narrow edge regions along the cutting edges.

The film 2 with adherent strips of the foil 4 continues from the cutting means 11 towards the right in FIG. 2 and in so doing, passes first into the nip between a pair of clamping rolls 16 and thereafter to a driving roll 17. The driving roll 1 is situated opposite to and cooperates with a further laminating roll 18. The clamping roll 16 as well as the driving rolls 17 are driven by means of, for example, electric motors, the driving rolls 17 having a slightly higher peripheral speed than the clamping rolls 16. The clamping rolls 16 are coated with a resilient material of a high friction coefficient, e.g., rubber, which means that the film 2, when it passes between the clamping rolls 16 and the driving roll 17, is stretched so that the transverse irregularities 9 are flattened out and the space between the cut edges of the foil 4 produced by the cutting edges 13 is increased. The foil web 4 thus has been converted to separate foil strips extending transversely over the film as illustrated in FIG. 1.

After the foil web 4 has been cut and the strips obtained have been separated, the second film 2 is introduced from underneath so that after heating by means of a further heat source 19, the second film 3 is fed into the nip between the laminating roll 18 and the driving roll 17, where it is pressed against the film 2 covered with the foil strips 4 and is laminated to it in the interspace between the individual foil strips along longitudinal edges of the film 2 and to the free surface of the individual thermoplastic-covered foil strips. The two films 2,3 are now sealed to one another in a liquid-tight seal around each individual foil strip, and the laminated material strips produced can now be separated from one another through transverse cuts in the interspace between the individual foil strips. This may be done in a succeeding operation, not shown, by means of a conventional cutting unit, but it is also possible, of course, to keep the material strips in the form of a web so as to perform the final separation in the packing machine at the same time as the application at the desired place of the material strips to the packing material. This is probably preferred in many cases but constitutes a known, conventional technique which is not described in any detail in this context.

As mentioned already the cutting roll 12 of the cutting means 11 cooperates with the mating roll 14, but it is also possible to place the cutting roll 12 at a position adjoining the work roll 5 (after the laminating roll 20 as seen in the direction of movement of the webs) so that the work roll 5 can serve also as a mating roll for the cutting of the foil web 4. The arrangement becomes a little more complicated, but at the same time more compact which in certain cases may be preferred.

Another possible variation of the preferred embodiment of the present invention consists in retaining the irregularities 9 formed in the film 2 with the help of mechanical devices instead of the conventional vacuum method described. Thus the projection 8 may be replaced by movable fingers or rods which form the irregularities and accompany them during the lamination of the film 2 to the foil web 4. After cutting of the foil web 4, during which the rods may possibly serve as holding-up tools for the cutting edge, the rods can be withdrawn again and returned with the help of an endless chain or the like.

While this invention has been illustrated and described in accordance with a preferred embodiment, it is recognized that variations and changes may be made and equivalents employed herein without departing from the invention as set forth in the claims.

We claim:

1. A method for manufacturing a laminated material strip for fabrication of packing containers, comprising the steps of:

forming transverse folds across a first film web;

laminating a web of substantially gas inpervious material to said first film web;

cutting the web of gas impervious material into individual strips at places corresponding to the transverse folds in the first film web;

stretching the first film web to flatten out the folds in the first film web and to separate the individual strips of gas impervious material; and laminating a second film to the first film to enclose the strips of gas impervious material between the first and second films in a gas-tight manner.

2. The method according to claim 1, wherein the folds in the first film web prevent the first film web from being cut when the gas impervious material is cut into individual strips.

3. The method according to claim 1, wherein the second film web is also sealed to the individual strips of gas impervious material, and wherein the second film is sealed to the individual strips of gas impervious material and to the first film web by heat-sealing.

4. The method according to claim 3, wherein a bonding agent is applied to both sides of said gas impervious material prior to being laminated to the first and second film webs.

5. The method according to claim 1, wherein said gas impervious material is aluminum foil and said first and second film webs are made of thermoplastic material.

6. A method for manufacturing a laminated material strip for fabrication of packing containers comprising the steps of:

forming transverse impressions across one side of a first film web to produce transverse folds that extend outwardly from the opposite side of the first film;

laminating a foil web to the one side of the first film web so that the portions of the first film web corresponding to the impressions are spaced from the foil web;

cutting the foil web into individual strips of foil at places corresponding to the impressions in the first film web without cutting the first film web;

stretching the first film web to flatten out and remove the impressions and folds in the first film web and to separate the individual foil strips to create an interspace between adjoining individual foil strips; and laminating a second film web to the first film web at the interspaces between adjoining individual foil strips and in order to enclose each of the individual foil strips on all sides between the first and second film webs in a gas-tight manner.

* * * * *